March 28, 1939.   F. A. WAGNER   2,152,293
HYDROSTATIC TOOL FEED
Filed Jan. 12, 1937
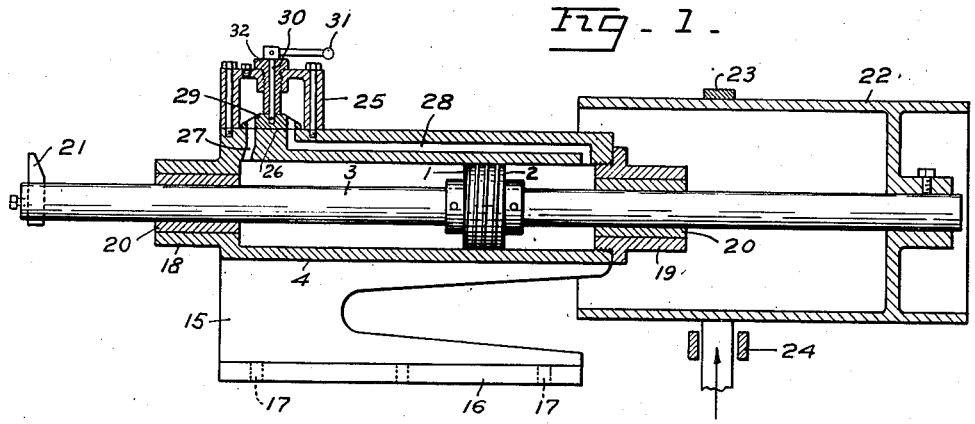
Fig. 1.
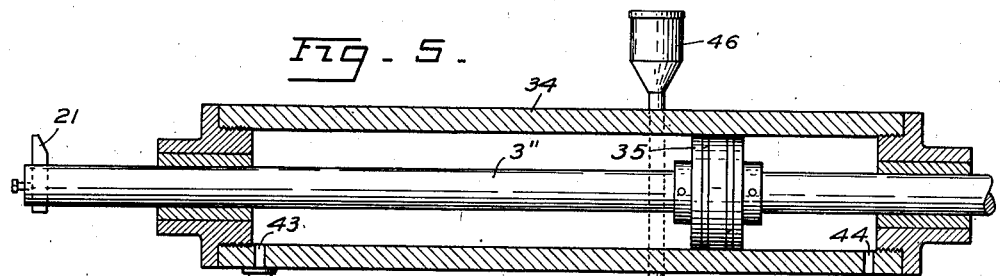
Fig. 5.
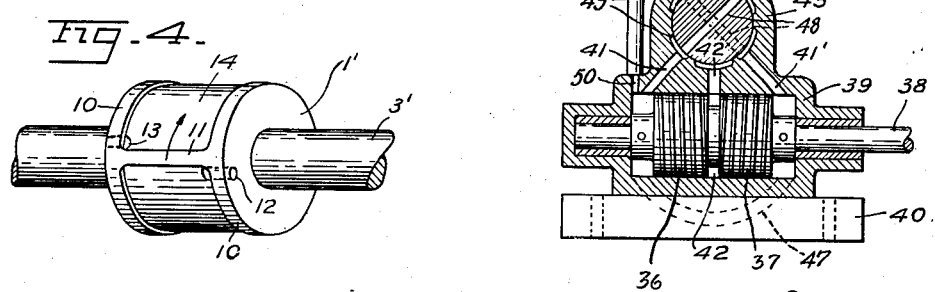
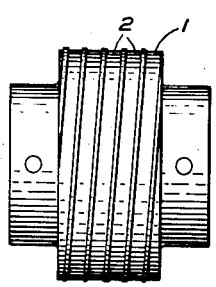
Fig. 4.
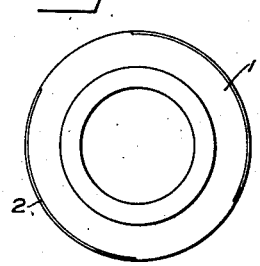
Fig. 3.
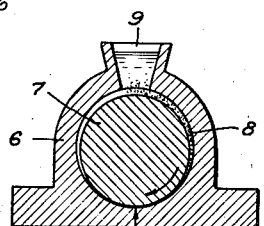
Fig. 6.
Fig. 2.
INVENTOR.
FREDERICK A. WAGNER
BY
ATTORNEY.

Patented Mar. 28, 1939

2,152,293

UNITED STATES PATENT OFFICE 2,152,293

HYDROSTATIC TOOL FEED

Frederick A. Wagner, Oakland, Calif.

Application January 12, 1937, Serial No. 120,245

5 Claims. (Cl. 77—32)

This invention relates to hydrostatic apparatus in general, and in particular a liquid controlled feed for machine tool elements such as a boring bar. The principal object of the invention is to provide improved hydrostatic means for control of a boring bar feed which will be simple, reliable, durable and cheap to manufacture. Other objects and advantages of the invention will appear in the following description and accompanying drawing.

Fig. 1 is a vertical section of my invention applied to a boring bar mounted on a bracket for attaching to a machine tool.

Fig. 2 is an enlarged side view of the spiral liquid forcing element used in the assemblage of Fig. 1.

Fig. 3 is an end view of Fig. 2.

Fig. 4 is a perspective view of a modified form of the rotor or liquid forcing element.

Fig. 5 is a vertical section of a boring bar assemblage similar to that of Fig. 1 but operated by a double or opposed spiral rotor or liquid forcing element.

Fig. 6 is a cross section of a simple shaft bearing shown with exaggerated clearance to illustrate the oil urging principle involved in my invention.

Before going into detail concerning the structures shown in the drawing it may be stated that the required longitudinal or "feed" movement of a boring bar of similar machine element, accomplished by hydrostatic means, is not new, as many such devices are moved back and forth by forcing oil under pressure against the ends selectively of a double acting piston to carry the tool or other element back and forth as required, but all of such apparatus, insofar as I am aware, require the use of extraneous pumps or other means to deliver the oil or other liquid under pressure sufficient to do the work, whereas in the preferred embodiment of my invention, I dispense entirely with extraneous pumps or sources of liquid pressure, and create the required pressure for the transfer of liquid entirely within the apparatus by means of a novel liquid forcing element or rotor operating on a principle which has heretofore never been applied to any useful purpose insofar as I am aware.

The device by which the liquid is forced along is shown in one form at 1 in Figs. 1, 2 and 3, and is a solid cylindrical piston, preferably of metal, formed with a very shallow single or multiple lead spiral groove 2 around its outer surface, and it is securely fastened on a suitable shaft such as the boring bar 3 by any desired means and rotatably mounted within a hollow cylinder 4 in which it fits very nicely yet without undue friction.

Such a device 1, when rotated in the cylinder filled with oil of a certain viscosity, will transfer the oil from one side of the piston to the other and thereby propel itself along very slowly (if free to move longitudinally) and at first glance would seem to be nothing but a helical or screw pump runner, for a screw pump runner revolved under similar conditions would act similarly.

However, it is not a screw pump runner and functions on a different principle, for the spiral groove has characteristics never used in a screw pump runner and it will only function properly in a liquid of relatively high viscosity, such, for instance, as machine oil of an S. A. E. viscosity range of from about 30 to 40 and will not function at all in water, alcohol, gasoline, etc., where a screw pump would be most effective.

The reason for the paradox is that the spiral groove is not deep enough to hold an appreciable volume of liquid nor the spiral rib high enough to force the water along like a spiral conveyor rotated at a high speed, due to the inertia of the water according to the principle of the screw pump, but contrary to this the spiral channel is of very slight depth—in the device of Figs. 2 and 3 which is full size (2¼" dia. for a 1⅛" boring bar) the preferred depth of the channel is from about 8/1000 to 20/1000 of an inch, and the deeper it is the less pressure or force developed, whereas the wider the channel the greater volume of liquid moved. A rotor of this size and angle of lead will advance in the oil filled cylinder about 9/1000" for each complete turn.

The principle upon which the rotor operates is that of an oil film in a common shaft bearing, and in which a film of the oil is dragged around by the shaft due to the viscosity of the oil and its adherence to the shaft so that extremely high pressures are developed at the point of maximum pressure, thus in Fig. 6 where a common bearing is shown at 6 with a shaft 7 therein, the clearance is exaggerated to show the globules of oil 8 from the reservoir 9 gradually being dragged, wiped, or rolled down into the constricted space with ever increasing pressure so that if a pressure gage reading were taken of the oil pressure at the point indicated by the lower arrow it would register hundreds to even thousands of pounds pressure per square inch in a large bearing. The action of my rotor is similar to the above except that the film of oil is forced to move laterally as well as around the axis of the device.

A definite spiral channel is not essential to carry out the invention and secure the lateral flow of the oil, the slight ribs merely serving to start the oil in the right direction but principally functioning as sealing rings to prevent pressure leakage across the rotor along the cylinder walls, and therein lies the advantage of a multiple lead or double lead as shown in Fig. 2.

In Fig. 4 is shown a modified form of rotor 1' secured to a shaft or boring bar 3' and in which form the rotor is a cylinder with a slightly raised collar 10 at each end and a single connecting rib 11, the surfaces of the collars and rib being adapted to revolve easily though snugly within the bore of an oil filled cylinder. At opposite ends of the cylinder and at opposite sides of rib 11 a hole or passageway 12, 13 is formed so as to vent the slight shallow space 14 through the end walls of the rotor at these points. If this rotor is substituted for the one of Fig. 1 or 2 it will operate the same way, as the oil entering at 12 during the revolving of the rotor is forced as a film around the device until it meets rib 11 and upon which it can only go one way—viz. laterally and out of hole 13, thus transferring the oil in very small quantities from one end of the rotor to the other and moving the rotor longitudinally in the opposite direction, slowly, but under considerable force. The shallow depression 14 must be very slight, preferably between 5/1000" to 20/1000" in depth with an oil of the grade mentioned. If the depth were, say, ⅛ of an inch, no force at all would be developed at the speed of a boring bar, nor would any appreciable force be developed in water as it is substantially without viscosity. The effective travel of the oil about a rotor as shown in Figure 4 is also spiral as it must be in order to enter and leave at the ends of the rotor through holes 12 and 13 on opposite sides of rib 11 which force it to take a spiral path.

Having, by the above explanation, established the fact that my rotor is not a screw pump runner and does not operate like one, it remains to show its application to a boring tool feeding mechanism.

In Fig. 1 the cylinder 4 is preferably cast with a bracket 15 with flange or flanges 16 provided with slots or bolt holes 17 for securing it to the mill or machine tool on which it is to be used. The casting is formed with an integral bearing hub 18 at one end and provided with a similar one, 19, at the opposite end removably screwed in place, while pressed in place within the hubs are bushings 20 fitting the boring bar 3 so nicely as to be substantially proof against oil of the viscosity mentioned from being forced out except sufficient to lubricate the bar.

The bar 3 passes through the bushings as shown and carries a conventional boring tool or cutter of any required form at one end as at 21, while at the other end it is equipped or connected by any suitable driving means for rotating it, the means shown here for illustrative purposes only, being a long or wide faced pulley 22 driven by a narrow belt 23 held from moving laterally as by fork arms 24 during the travel of the boring bar back and forth.

At the upper part of the cylinder casting is an oil reservoir 25 with a valve seat 26 adjacent its bottom to which by-pass ducts 27, 28 are extended from opposite ends respectively of the cylinder, and a suitably ported or cross-slotted flat valve 29 fitted with stem 30 and handle 31 serves for controlling the by-pass effect to any extent as well as for admitting oil from the reservoir when the valve is more or less open. The valve stem is shown with an adjusting nut 32 around the stem. Any other style of by-pass valve may be used either combined or separate from the reserve oil reservoir.

From what has been said of the action of the rotor in a cylinder of oil, the operation of the tool feed of Fig. 1 hardly requires explanation, as it will be evident that with the by-pass closed, rotation of the boring bar by the driving pulley will turn the rotor and advance the tool the maximum for which the particular rotor is designed to give, and by manipulating the by-pass valve the feed movement of the bar can be slowed down to any extent. Thus by adjusting the valve until the propulsive force is just sufficient to balance the very slight leakage of oil past the rotor, it will be locked against longitudinal motion, whereas with the by-pass open it will be free for sliding either way without restriction.

In the design of Fig. 5 (more specifically covered in my copending divisional application filed on February 13, 1939, under Ser. No. 256,091) a boring bar 3" is mounted in a cylinder 34 similar to that of Fig. 1 but is fitted with a nicely fitting or sealing ring type piston 35 firmly secured to it. The hydrostatic rotor is here made double, or, that is, of right and left spiral portions 36—37, secured to a shaft 38, and rotatably mounted in a nicely fitting cylinder 39 fixed to the base or other convenient part of the supporting stand or bracket 40. The rotor is blocked against longitudinal motion by the end hubs as shown and is revolved by any suitable means applied to shaft 38 and upon suitable rotation forces the oil received from both ends from ports 41, 41' toward the center and out of central port 42.

These ports, as well as ports 43, 44 at opposite ends of the feed cylinder 34, all lead by suitable ducts indicated to a four-way plug or rotary multiple valve 45 which may be of any suitable construction to connect port 42 with either end of the feed cylinder while connecting the opposite end to both of the rotor cylinder end ports and, also, when desired directly connecting the feed cylinder ports 43—44 together more or less to any degree as may be desired to the maximum extent of forming a complete by-pass for the oil at opposite sides of piston 35 by way of the passageway 47 dotted in the lower part of the casting 40 and which passageway is always open to opposite ends of the double rotor.

The cross ports 48 of the rotatable plug 45 of the valve are staggered or offset as indicated, and when the plug is rotated the cross ports connect with longitudinally extending channels 49 arranged around the interior of the valve housing, and respectively made of such lap and lead as to yield any of the effects above mentioned, and as will be more fully shown in my divisional patent application filed under Serial No. 256,091. Thus the boring bar may be made to travel in either direction at any speed within the capacity of the particular device, or completely by-passed for free longitudinal movement. Any suitable reserve oil reservoir may also be incorporated in the assemblage of Fig. 5 such, for instance, as indicated at 46, and which connects directly with a passageway 50 leading to the oil space at one end of the rotor.

While a boring bar feed or other moving device actuated in accordance with my invention travels with considerable force, the device of Fig. 1 with rotor of the size of Fig. 2 developing at one revolution a second a longitudinal push of from 100 to approximately 400 pounds, depending on the quality of oil used, yet in case of the bar meeting an irresistible obstruction or coming to the end of its travel it will do no injury but will simply heat the oil in the nature of a homogenizer.

Such a device being sealed within the cylinder and lubricated requires absolutely no attention and will not wear in years of daily use, and if the main bushings 20 be long enough and of proper material no leakage to amount to anything will occur at these points, though it is obvious that suitable gaskets or cup leathers may be incorporated in the design if desired.

In considering my invention as above set forth, it is of course obvious that the very narrow spiral oil passage of the rotor might be formed on the inside of the cylinder wall instead of on the rotor, also that instead of the rotor and boring bar travelling longitudinally, these could be held against such movement and the cylinder could be made to travel instead, and any such modifications being mere reversal of parts are intended to be covered in my appended claims, as well as the arrangement of Figure 4 which operates in the same general manner as the spiral oil channel or groove of my claims.

Having thus described my invention and the manner of its use, what I claim is:

1. A feed mechanism for machine tools and the like comprising a fixed cylinder adapted to hold oil, a rotor fitting in said cylinder, of a length to provide for longitudinal movement in said cylinder, a substantially oil-sealed shaft extending into the cylinder and connected to said rotor adapting it for rotary as well as longitudinal movement within the cylinder, said rotor formed with a relatively minute always open spiral oil channel arranged and adapted to convey oil from one end to the other of the rotor as the same is revolved in the cylinder when filled with oil, and whereby the rotor and shaft are forced to travel longitudinally of the cylinder when revolved, and due to the minuteness of the oil channel and viscosity of the oil the shaft is substantially locked against endwise movement when the rotor is still.

2. A feed mechanism for machine tools and the like comprising a cylinder adapted to hold oil, a rotor fitting in said cylinder of a length to provide for longitudinal movement in said cylinder, a substantially oil-sealed shaft extending into the cylinder and connected to said rotor adapting it for rotary as well as longitudinal movement within the cylinder, said rotor formed with an extremely shallow but always open spiral oil channel arranged and adapted to convey oil from one end to the other of the rotor as the same is revolved in the cylinder when filled with oil, and whereby the rotor and shaft are forced to travel longitudinally of the cylinder when revolved, and due to the minuteness of the oil channel and viscosity of the oil the shaft is substantially locked against endwise movement when the rotor is still, means for mounting the cylinder on a machine tool, and means forming with said shaft a boring bar for said machine tool.

3. In a construction as specified in claim 1, a passage exterior to the cylinder opening to both ends thereof and fitted with a by-pass valve.

4. In a construction as specified in claim 1, a passage exterior to the cylinder opening to both ends of the cylinder and fitted with a by-pass valve, and means for replenishing oil in said cylinder against leakage losses.

5. A hydrostatic feed mechanism comprising a feed bar mounted for longitudinal movement, an oil filled cylinder, a rotary piston in said cylinder formed with an extremely shallow spiral groove therearound freely open at both ends so as to force oil from one end to the other as said rotary piston is revolved, means for revolving said piston, and means for moving said feed bar by the pressure of the oil so developed, said shallow spiral groove though freely open being of such shallowness as to substantially lock the feed bar against longitudinal motion when the rotary piston is still.

FREDERICK A. WAGNER.